L. L. UPSHAW.
COTTON HARVESTER.
APPLICATION FILED MAR. 13, 1912.

1,041,202.

Patented Oct. 15, 1912.

L. L. UPSHAW.
COTTON HARVESTER.
APPLICATION FILED MAR. 13, 1912.

1,041,202.

Patented Oct. 15, 1912.

UNITED STATES PATENT OFFICE.

LUCIUS L. UPSHAW, OF DENISON, TEXAS, ASSIGNOR OF ONE-FIFTH TO GODWIN L. BLACKFORD AND ONE-FIFTH TO PATRIC H. TOBIN, BOTH OF DENISON, TEXAS.

COTTON-HARVESTER.

1,041,202.

Specification of Letters Patent.

Patented Oct. 15, 1912.

Application filed March 13, 1912. Serial No. 683,462.

*To all whom it may concern:*

Be it known that I, LUCIUS L. UPSHAW, a citizen of the United States, residing at Denison, in the county of Grayson and State of Texas, have invented certain new and useful Improvements in Cotton-Harvesters, of which the following is a specification.

This invention relates to certain new and useful improvements in machines designed for the harvesting of the cotton crop, and the invention consists of the parts, and the constructions, arrangements and combinations of parts which I will hereinafter describe and claim.

In the accompanying drawings forming part of this specification and in which similar reference characters indicate like parts in the several views.

Figure 1:
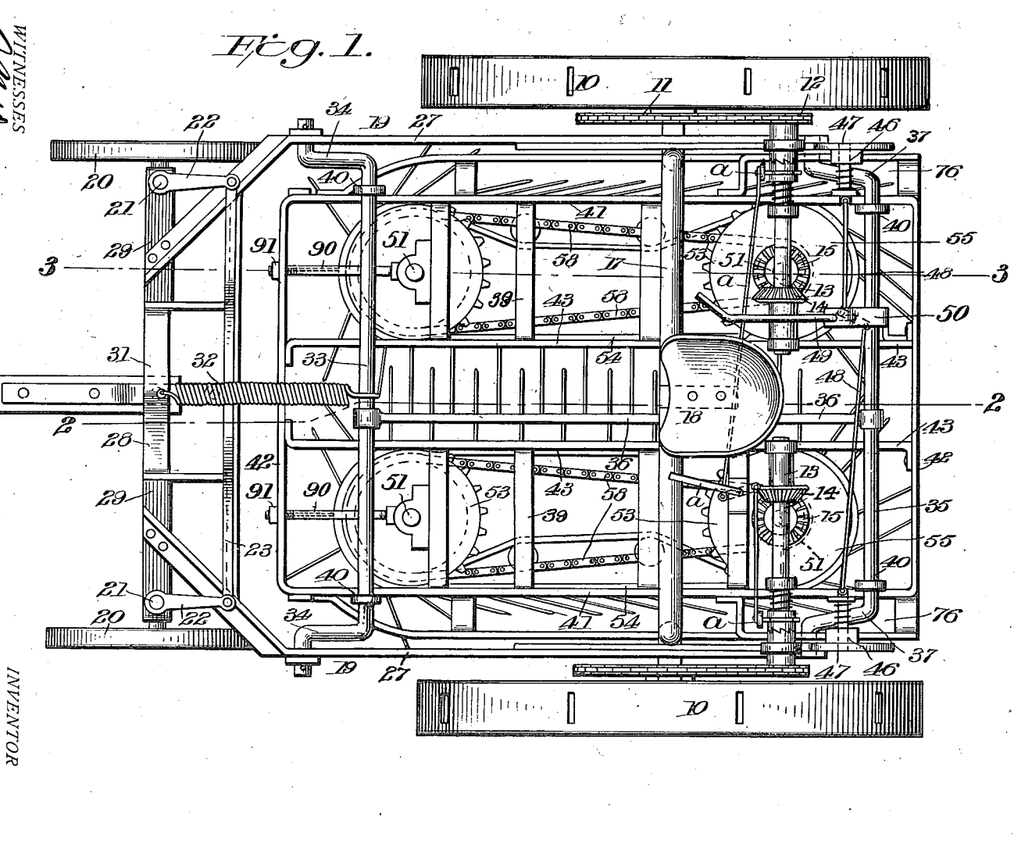
Figure 1 is a top plan view of a cotton harvesting machine embodying the salient features of my invention.

40 In carrying out my invention the various parts of the machine may receive power and actuation from the traction of the main or supporting wheels of the machine, and to this end, the traction wheels, 10, may be of any approved construction, whose tread surfaces will so engage the ground that as the machine is drawn thereover, the said wheels will be positively rotated and without liability to slippage. The hubs of the wheels are shown as provided with sprocket wheels, 11, and each of these wheels is designed to drive a smaller sprocket wheel, 12, mounted on a horizontal transverse shaft, 13, extend- ing across the top of the rear portion of the machine, said shaft carrying a slidable beveled gear, 14, connected to the shaft, said gear meshing with a corresponding gear, 15, fixed to the upper end of the vertical shaft, 51, as shown in Fig. 1. The arrangement of this train of gearing may be of any usual type and any of the well known equivalents for the gears may be used without departing from the spirit of the invention.

The main supporting or traction wheels, 10, are loosely mounted on the journal ends of a bent shaft, 17. This shaft is of arched form and extends across the top of the machine slightly in rear of the center thereof, and it forms a support for the standard, 18, of the operator's seat, and for such other adjuncts as a machine of this character might require, placed within the ready access of the operator.

The main frame, 19, may be of any suitable construction and is supported on the main shaft and by steering wheels, 20, appropriately journaled at the front of the machine. These steering wheels are journaled upon the cranked ends of vertical rods or turning posts, 21, located at opposite sides of the front of the machine and suitably journaled in the main frame thereof, the upper ends of the turning posts having lever arms, 22, fixed to them and the free ends of these arms being connected to an arched-shaped cross-bar, 23, which extends from the lever arm at one side of the machine to the corresponding arm at the other side of the machine, the central portion of the arched cross-bar being in turn suitably connected to the inner end of a plate or strap, 24, fixed to the tongue or pole, 25, to which a team may be attached in the usual manner, said tongue or pole having its inner end pivoted upon a king-bolt or other like connection, 26.

The main frame of the machine is designed to be rigid and as light as consistent with the work which a machine of this character is designed to perform. It may be constructed of angle-iron, or of other appropriate material, and it comprises the side members, 27, whose forward ends are shown as adapted to be riveted or otherwise fixedly secured to a front cross-bar, 28. This cross-bar is bent at its center to form an arch which enables the machine to pass over a row of cotton plants, and the rear end of the tongue or pole is secured to this arched portion, by the bolt or pivot heretofore mentioned.

The portions, 29, of the front cross-bar, 28, at each side of the central arch are approximately horizontal and the front end of the side bars, 27, of the main frame are secured to these horizontal portions, the outer ends of the cross-bar being bent downwardly about parallel with the steering wheels and have their lower ends bent inwardly at 30. The vertical steering posts upon which the front steering wheels are turnably mounted are journaled in the horizontal portions 29, of the front cross-bar and the inturned lower ends, 30, of said front cross-bar, and the central arched portion of the frame may be extended or otherwise provided with a vertical projection, 31, to which is attached one end of a helical spring, 32, whose opposite end is suitably secured to the central portion of a crank shaft, 33, which extends crosswise of the machine, and has its ends bent downwardly and forwardly to form cranks, 34, provided with out-turned journals which are pivotally mounted in the main frame.

Figure 2:
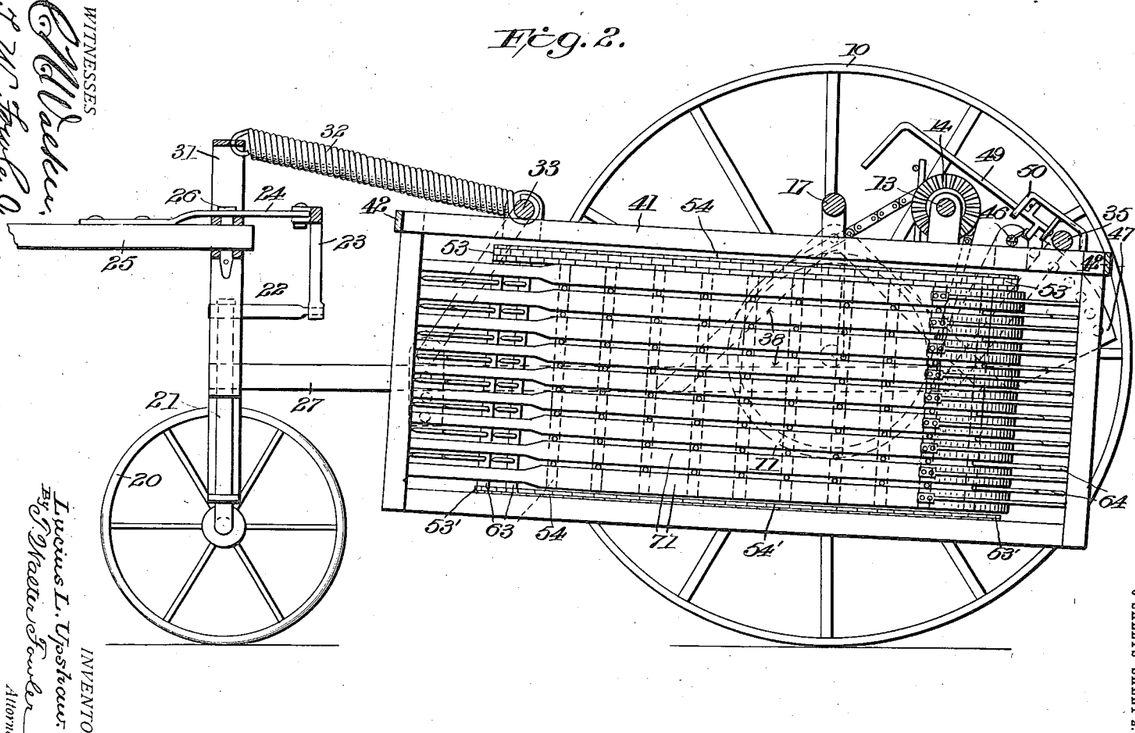
Fig. 2 is a longitudinal central section of the machine on the line 2—2 of Fig. 1.

The crank shaft, 33, just referred to, is connected to a corresponding crank shaft, 35, located at the rear of the machine and which extends across the same, by means of a connecting bar, 36, the cranks, 37, of the second named shaft extending downwardly and forwardly and having journal ends pivotally mounted in one of the arms of U-shaped brackets or extensions, 38, secured to the main frame as shown by dotted lines in Fig. 2. The main frame thus supports at its front and rear the crank arms of the two parallel cross-shafts, 33 and 35, which are connected to move in unison to thereby raise and lower the upper frame.

By reference to Fig. 1 it will be seen that the cross-shafts, 33 and 35, are journaled in bearings, 40, fixed to an upper frame which is shown as consisting of parallel and equal sides, 41, and parallel and equal ends, 42, said frame being in operation slightly inclined to the horizontal, and said frame, also, having parallel intermediate bars, 43, which extend from the front to the rear end and are secured thereto to make a rigid upper frame-work. By reason of this construction it will be seen that when the upper frame is unlocked from the rigid main frame, as I will hereinafter explain, and the operator presses downwardly on the front cross-shaft or the cross bars, 39 of the upper frame, the two shafts, 33 and 35, will turn about their lower journal ends and the upper frame and its contained mechanism, hereinafter described, will be lowered relatively to the fixed main frame and to the cotton plants. The upper frame is also provided with vertical standards or supports, 44, and to these is fixed a bottom, 45, which is closed and is preferably provided with surrounding vertical flanges, 45'.

The machine like others of its character, is duplex in its construction; that is, each side of the machine will be provided with supplemental driving and picking mechanism and with the closed bottom portion before mentioned, the bottom portion, as well as the inner vertical standards of the upper frame being spaced from each other a suitable distance to form a clear open space through which plants will pass as the machine straddles the row and is drawn over the ground, and as plants pass through this space, the cotton is engaged by the picking devices and removed from the boll in the manner which I will presently indicate.

As the helical spring, 32, before mentioned, is connected at one end to the front portion, 31, of the fixed frame and at the other end to the front cross-shaft, which supports the movable frame, it is evident that said spring acts as a counterbalance for the upper frame and the parts carried thereby, and hence when the shafts, 33 and 35, are rocked and the upper frame and the mechanism which it carries is lowered, the spring is distended and when pressure is removed from the shaft, the spring will exert its power to return the frame and its connections to an elevated position. In other words, if the operator wishes to vertically change the position of the upper frame and its various parts, he may press down upon the front shaft, 33, and this will cause the front and rear cross-shafts to swing downwardly about their journal ends, thus lowering the movable upper frame and its associated parts; when the pressure upon the foot lever is removed, or when the upper frame is unlocked from a lowered position, the spring, 32, which has sufficient power to balance the weight of the shaft, will cause the frame and its connected parts to move to an elevated position.

In order that the upper frame and its accessories may be held in any of the adjusted positions and at any desired vertical height, I mount upon the upper frame suitable spring-actuated latches, 46, adapted to engage holes formed in segments, 47, secured to the fixed lower frame, as shown in Fig. 2.

The spring latches are connected by rods, 48, or otherwise with the crank or a lever, 49, suitably journaled in a support, 50, on the upper frame adjacent the operator; the operation of the lever in one direction withdraws the spring-actuated latches from their engagement with the perforated segments and unlocks the swinging upper frame from its fixed connection with the lower frame and thereby permits the two crank shafts, 33 and 35, to turn about their journal ends and the upper frame and its various parts to be vertically adjusted.

It will be understood that the mechanism herein described may be of any suitable character and will appear at both sides of the longitudinal center of the machine, and that each side of the machine may be supplied with the spring-actuated latch and holding segment as well as the power transmission devices heretofore described and suitable clutch mechanism, a, for connecting and disconnecting the power devices at will.

The picking mechanism is well illustrated in Figs. 1, 2, 5, 6, 7, 8 and 9, and as this mechanism is duplicated at each side of the longitudinal center of the machine, a description of one of the mechanisms or of the mechanism along one side of the row of plants, or the longitudinal center of the machine, will apply to the corresponding mechanism at the other side. Each of the picking mechanisms will include vertical shafts, 51, appropriately journaled near the front and rear ends of the machine, and equi-distant from the longitudinal center of said machine, the lower ends of these shafts being journaled in any well known manner on or in the closed bottom, 45, of the vertically adjustable frame, the upper ends of the shafts being likewise suitably journaled in cross-bars, 52, fixed to the upper portions of said frame.

The vertical shaft, 51, at the rear of the machine has fixed to it the beveled pinion, 15, which is engaged by the corresponding pinion, 14, on the transverse shaft, 13, which derives power directly from the traction wheels through the gears, 11, 12, before mentioned, and to said vertical shaft, 51, is fixed a sprocket wheel, 53, around which passes a suitable sprocket chain, 54, said chain passing also around a corresponding sprocket wheel fixed to the corresponding vertical shaft at the front portion of the frame whereby the shafts at opposite ends of the same side of the frame of the machine are rotated in unison in the same direction. There are corresponding sprocket wheels, 53' at the lower ends of the front and rear vertical shafts with a sprocket chain, 54', passing around the same. Each of the vertical shafts is also provided with a series of appropriately spaced pulleys, 55, which are loose on said shafts. These pulleys receive the shafts and at the same time the pulleys are permitted to rotate independently of the shafts. This may be effected by making each pulley with an individual hub or each of the pulleys may be formed as a part of a long sleeve or bearing, 56, through which the vertical shaft passes.

On the upper portion of the front vertical shaft and fixed to said shaft so as to revolve in unison with the sprocket wheels on this shaft is a sprocket wheel, 59, from which a sprocket chain, 58, extends to a similar sprocket 57, which is loosely mounted upon the vertical shaft, 51, at the rear portion of the machine, the diameter of this loose sprocket, 57, being, however, so much less than the diameter of the sprocket, 59, that the smaller sprocket is driven at a higher rate of speed and transmits its speed to the pulleys, 55, it being understood that this smaller sprocket will be secured to the sleeve, 56, of the pulleys at this end of the machine and that it is loosely mounted relatively to the shaft which it embraces, but is fixed to turn with and communicate power to the said pulleys.

Around the pulleys, pass series of endless belts, 60. Above and below each of these belts and spaced from the edges thereof are suitable fixed plates or tracks, 61, the edges of the moving belts and the adjacent surfaces of the fixed tracks forming channels, 62, in which operate the inner ends of the picker spindles, which I will presently describe.

The upper and lower main sprocket chains, 54, 54', are connected by vertically disposed rods, or bars, 63, whose upper and lower ends are journaled on the sprocket chains 54, 54', so that the rods may swing horizontally about these ends as an axis. These rods are vertically arranged and are spaced suitable distances apart along the sprocket chains and they pass over the outside of the traveling belts, 60, which latter have a speed about twice that of the sprocket chains, 54, 54', and the fixed horizontal guides, 61, and said rods, of which there may be any desired number, spaced any suitable distance apart, carry the picker spindles, 64, shown in Figs. 6 and 9. These spindles are horizontal and they are loosely mounted in the vertical rods, 63, which rods may be provided with tubular bearings, 63', for the inner ends of the picker spindles, whereby the spindles will be loosely and rotatably mounted and will be held in horizontal position and be braced against vertical thrust due to contact with branches of the plants.

The inner ends of the picker spindles have fixed to them suitable rollers, 65, the diameter of which is approximately equal to the vertical width of the space, 62, between the edge of one of the endless traveling belts, 60, and the adjacent surface of one of the fixed guides, 61. In other words, each of the picker spindles will have its roller entering and occupying the space, 62, between one of the fixed guides and the movable edge of one of the endless traveling belts and, therefore, the roller will be confined between these two opposing surfaces and will be rotated positively by frictional contact with the edge of the movable belt, which has a speed twice that of the sprocket chains, 54, 54', which carry the picker carrying bars, 63.

The rotation given the picker spindle is rapid because of the fast traveling belt and this movement is continued as long as the picker spindle roller is in frictional engagement with the belt and fixed guide. Also to make more positive the rotation of the spindles, I may supply the fixed guides with a layer of some other material, 66, (Fig. 6) such as leather, rubber, or the like, as may be desired.

Each of the vertical bars, 63, which bars are arranged in substantially close parallel order on the driving sprocket chains, 54, 54', will be provided with a like number of picker spindles, each projecting in the same direction and arranged horizontally one above the other, with the picker spindles at one side of the machine standing opposite the spaces between spindles on the opposite side of the machine. Each of the picker spindles, 64, consists of a hollow shaft or tube which may be closed at the outer end and which end may be pointed to facilitate the stripping of the cotton which has been gathered by the spindles, said shaft or tube being perforated throughout its length with the perforations, 67, extending radially through the walls and adapted to permit the projection therethrough of the bristles or fiber of a suitable brush material, 68, and which brush material may be interwoven or otherwise carried by a twisted wire or other holder, 69, which is passed into the tube so that tufts or bunches of bristles or fiber will project through the openings a sufficient distance to cause them to engage the cotton when revolved in contact therewith and thus remove the cotton from the boll. By using twisted wire with the fiber fixed in the coils thereof, it is quite evident that by a rotation of the twisted wire, in the spindle, the brush fiber may be projected or withdrawn, thus adjusting the length of the fiber which is exposed on the outside of the picker spindle.

Figures 6, 7, 8, 9:
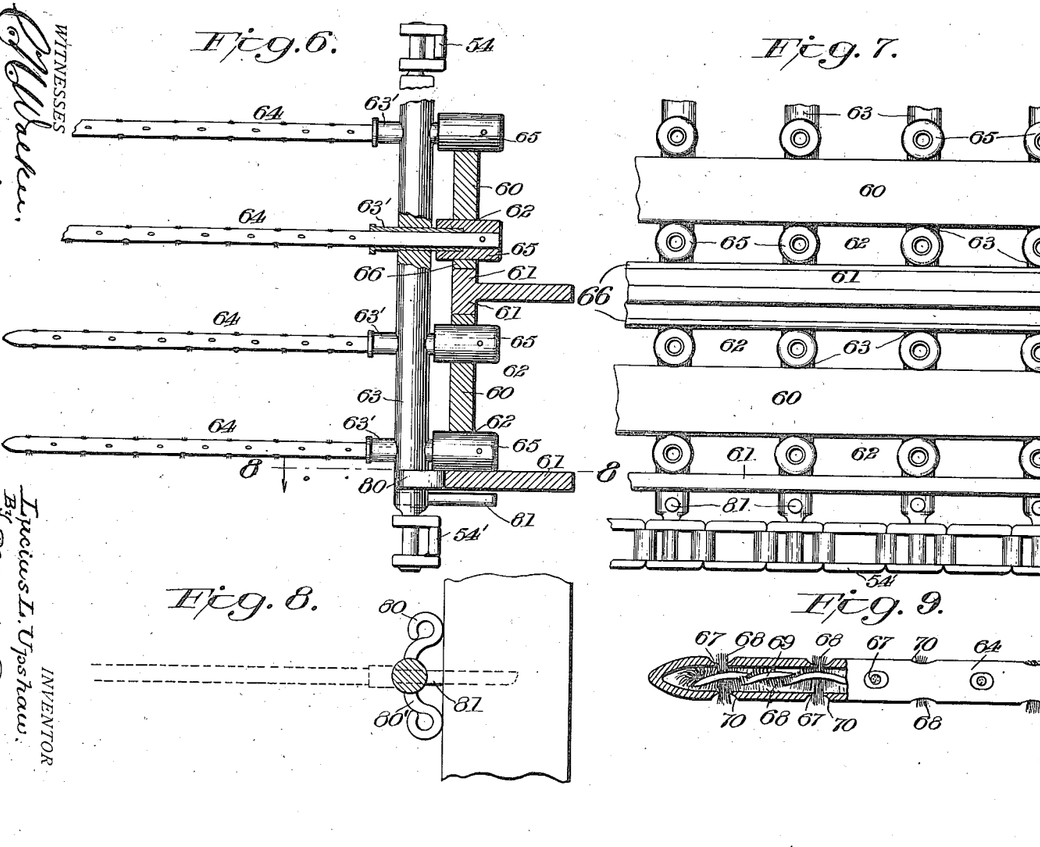
Fig. 6 is an enlarged detail partially in section showing a portion of one of the vertical rods, 63, with its picker spindles and rollers and showing the belts and fixed guides between which the rollers are frictionally engaged.
Fig. 7 is a side elevation of Fig. 6.
Fig. 8 is a cross-sectional view on the line 8—8 of Fig. 6.
Fig. 9 is an enlarged detail of a portion of one of the picker spindles with a part broken away to show the inclosed brush material.
Figure 10:
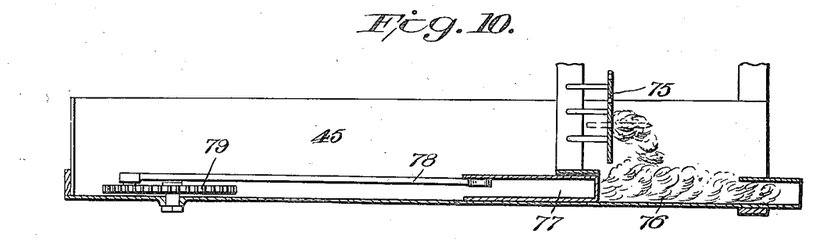
Fig. 10 is a sectional view on the line 10—10 of Fig. 5.

It will be observed in Fig. 9, that I have countersunk the outer ends of the perforations, 67. This provides concaved depressions, 70, into which the outer ends of the brush fiber may be bent in any and all directions without material injury to the fiber, when stripping the spindle of an accumulated mass of picked cotton. This construction is important as protecting and saving the projecting ends of the brush fiber from excessive sharp bends and thereby breakage and destruction; at the same time it allows the exposed fiber to readily yield below the outer surfaces of the spindle and accordingly facilitates the quick and easy stripping of the accumulated mass of picked cotton.

At each side of the space through which the cotton plants pass during the picking operation and secured to the vertical bars of the upper movable frame of the machine, and spaced apart a distance sufficient to enable the picker spindles to project therethrough are plates or boards, 71, which form a substantially smooth surface between which the growing plants are guided, thus protecting them as much as possible and preventing interference with the operating movable parts of the machine.

The aforesaid fixed guides 61, which operate in conjunction with the edges of the movable belts, 60, for rotating the rollers on the inner end of the picker spindles, may have inwardly projecting arms, 72, with split hubs, adapted to embrace vertical supports, 73, and by means of screws, 74, or like fastening devices of any suitable character engaging the split portions of the hubs of the projections, 72, the said fixed guides may be adjusted vertically to compensate for any wear of the picker spindle rollers, or when any occasion requires that the space between the fixed guide and the movable belt shall be adjusted so that the picker spindle rollers may be suitably frictionally engaged and rotated.

Figure 5:
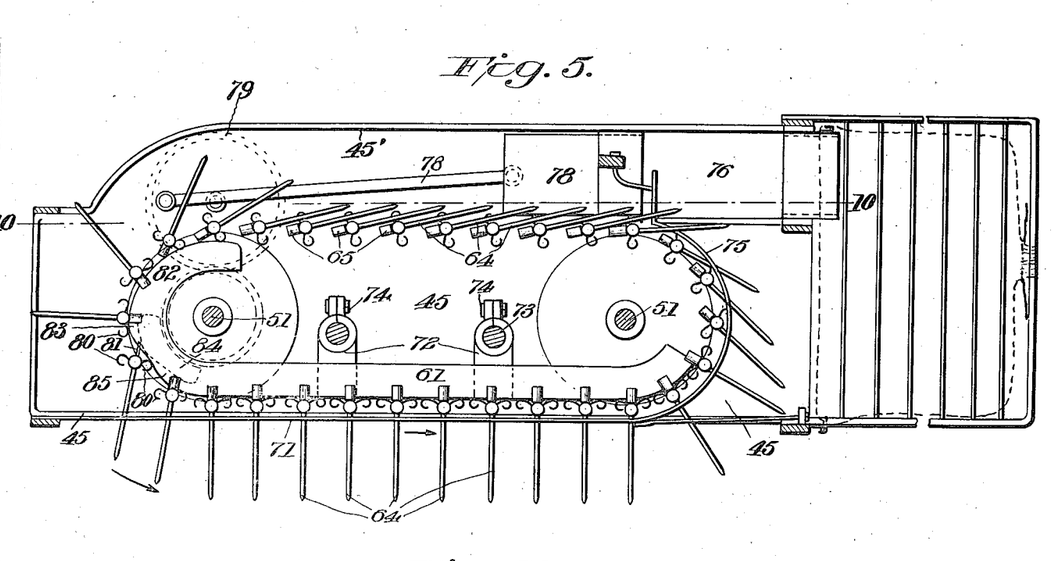
Fig. 5 is a horizontal sectional view on the line 5—5 of Fig. 3.

At the rear end of the machine are arranged suitable curved plates, 75, which are spaced from each other a distance sufficient to allow the picker spindles to pass therebetween, said plates serving as strippers for the cotton carried by the picker spindles, the cotton thus removed from the spindles falling into a chute or trough, 76, at one side of the closed bottom of the machine and being engaged by a plunger or follower, 77, suitably mounted for horizontal movement, on said bottom, and being reciprocated by means of a pitman, 78, connected eccentrically to a gear wheel, 79, journaled on the bottom and driven by power derived from the front vertical shaft, 51, whereby during the operation of the machine, the pitman or follower is actuated to engage and advance the picked cotton into a bag or like receptacle positioned to receive the same, as shown by dotted lines in Fig. 5.

During the travel of the picker spindles it is highly desirable that in their active position they shall project horizontally across the plants, as indicated in Fig. 1, and as the loaded spindles reach the rear portion of the machine, and pass around the pulleys, they progressively become tangent to the pulleys as they pass through the stripper plates and are by the latter relieved of the accumulated cotton. In other words, the picker spindles fold relatively to the sprocket chains; their carrying rods or bars turn at their ends in these chains, and they remain in this folded position pointing rearwardly and inclined slightly to the line of travel of the sprocket chains until just before they reach the forward end of the machine, at which point they are again righted or projected radially in passing around the front pulleys so that when they arrive at the entrance of the space through which the plants pass they will project crosswise of this space in a horizontal direction and will be held in this position during the period of their rotation or while gathering the cotton.

By reference to Figs. 6 and 8, it will be seen that the lower ends of the vertical rods, or bars, 63, which carry the picker spindles are provided with three radial arms, 80, 81', 81; two of these arms, 80—80' project from opposite sides of the bar or rod and may be slightly curved, while the third arm projects radially at about right angles to the other arms. Thus as the folded picker spindle reaches approximately the forward end of the machine, one of the arms, 80, will engage and ride upon the outer edge of the cam portion, 82, of the lower fixed guide, 61, and as the sprocket chain continues in motion with this arm bearing upon said cam edge, the rod or bar is progressively turned in its bearings on the sprocket chains, until said arm reaches a high point, 83, on the cam; at which point the rod or bar has made about a half revolution. It is here that the third arm, 81, of the rod or shaft comes into play and this arm, which projects radially from the arm or rod, now engages a cam, 84, fixed to the lower guide, 61, whereby during the continued movement of the sprocket chains, the rod or bar is further turned by the third arm passing over the cam, thereby completing the turning of the rod or bar, 63, and bringing its side arm, 80', into engagement with the cam surface, 85, of said guide and which side arms by resting against the guide at each side of the axis of the bar or rod, hold the picker spindle in such position that it will enter the space occupied by the plants and will be thrust longitudinally into the foliage of said plants at the beginning of the backward course of the picking spindles, in which position the picker spindles remain until they emerge through the space at the rear of the machine and convey the accumulated cotton to the stripping devices.

Figure 3:
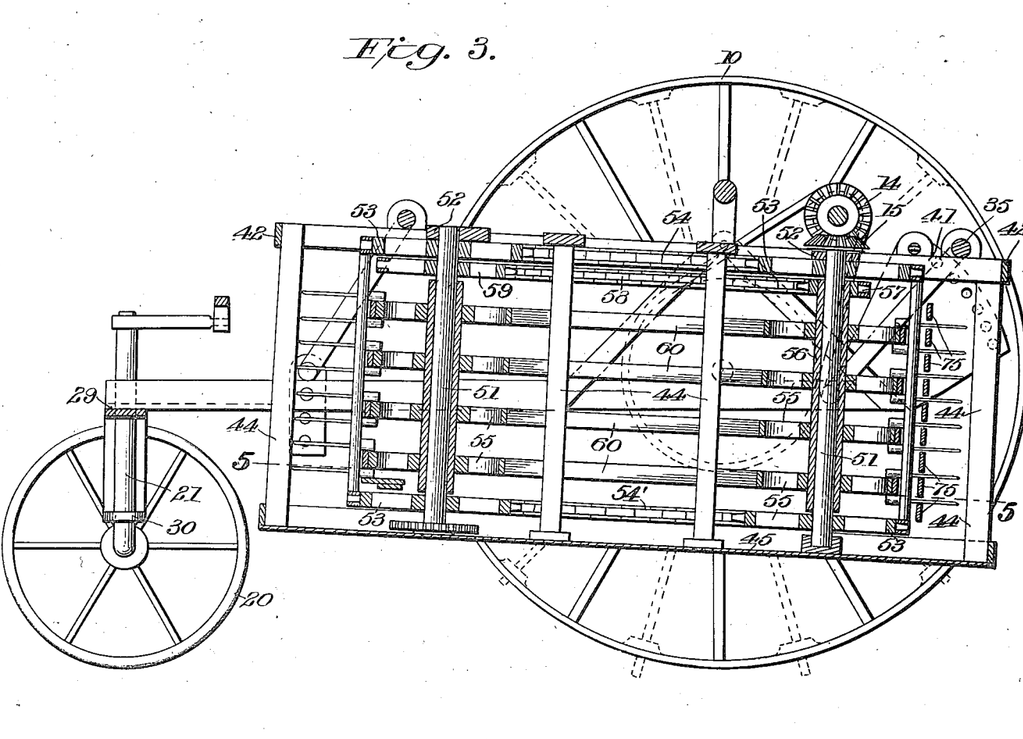
Fig. 3 is a longitudinal vertical section on the line 3—3 of Fig. 1.
Figure 4:
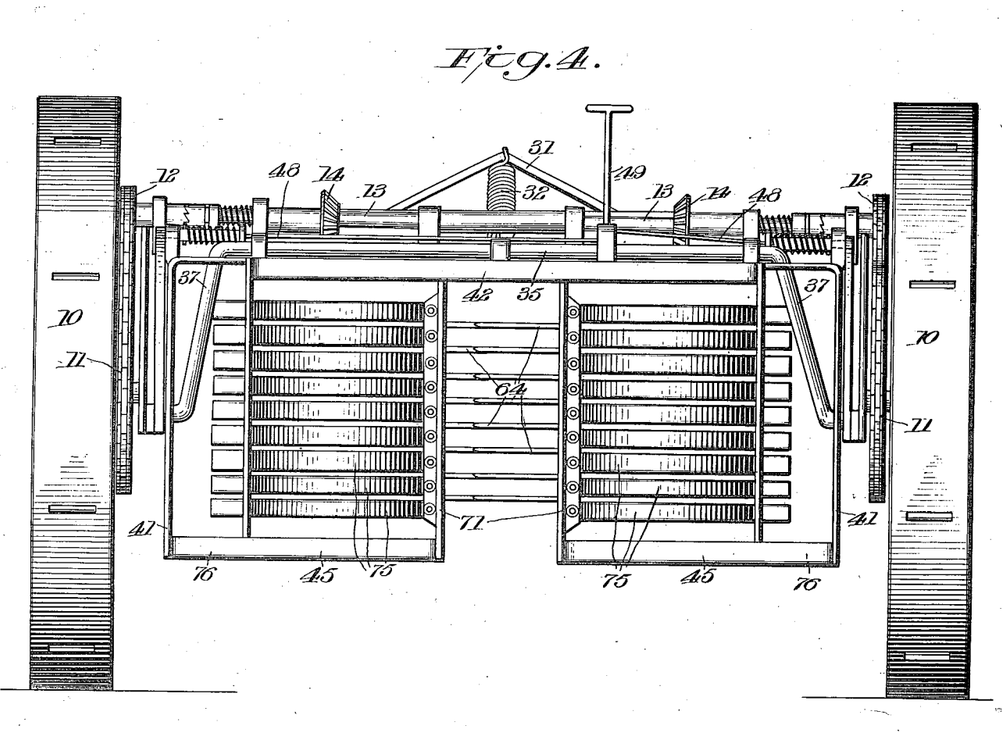
Fig. 4 is a rear view of the machine.

In practice I prefer that the main bearing and supporting wheels, 10, shall be supplied with suitable means for increasing the traction when the machine is traveling over sandy or loose soil in which case each of said wheels will carry suitable spades, or like projections adapted to be extended beyond the circumference of the bottom of the wheel to dig into the ground and take a firm hold thereon and to be retracted within the circumference of the wheel when the machine is traveling over hard ground. Such a wheel, however, does not form any essential part of the present invention, but is shown in dotted lines in Fig. 3 and is described and claimed in a companion application filed March 13, 1912, Serial Number 683461.

In this machine suitable provision will be made for taking up any slack in the carrier belts and, therefore, any well known form of belt tightening arrangement may be used. In Fig. 1 I show an arrangement for this purpose as comprising rods, 90, so connected with the supports for the vertical shafts that by means of a nut, 91, on said rods, the boxes or bearings for said shafts may be moved horizontally to tighten the belts and thereby keep them under proper tension.

Having thus described my invention what I claim as new and desire to secure by Letters Patent is:—

1. A cotton harvester comprising a frame and supporting wheels, endless carriers mounted in the frame, means for operating the carriers, picker spindles movable with the carriers and opposed friction surfaces between which the spindles travel in contact, one of said surfaces being movable and the other fixed, and means for imparting an accelerated speed to said movable surfaces.

2. A cotton harvester comprising a frame and supporting wheels, endless carriers mounted in the frame, picker spindle supports on the carriers, endless traveling belts operating with but at a higher speed than the carriers, picker spindles horizontally journaled in said supports, fixed guide tracks arranged parallel with and spaced from the belts, said picker spindles being confined between said fixed tracks and the belts and rotated thereby.

3. A cotton harvester comprising a frame and supporting wheels, endless carriers mounted in the frame, picker spindle supports on the carriers, endless traveling belts operating with but at a higher speed than the carriers, picker spindles horizontally journaled in said supports, fixed guide tracks parallel with the belts and upon which the spindles travel, said belts opposing the tracks and confining spindles between themselves and the tracks.

4. A cotton harvester comprising a frame, supporting wheels therefor, endless carriers mounted in the frame, picker spindle supports on the carriers, endless traveling belts operating with but at a higher rate of speed than the carriers, picker spindles horizontally journaled in said supports and having fixed rollers at their inner ends, stationary guide tracks parallel with the belts, said rollers being confined between the fixed tracks and the belts and rotated by frictional engagement therewith, and cotton collecting means carried by the spindles.

5. A cotton harvester comprising a frame, supporting wheels therefor, endless carriers mounted in the frame, picker spindle supports on the carriers, endless traveling belts operating with but at a higher rate of speed than the carriers, picker spindles horizontally journaled in said supports and having fixed rollers at their inner ends, stationary guide tracks parallel with the belts, said rollers being confined between the fixed tracks and the belts and rotated by frictional engagement therewith, and cotton collecting means carried by the spindles, said spindle supports having opposite ends pivotally journaled on said carriers and capable of a swinging movement in a horizontal direction.

6. A cotton harvester comprising a frame, supporting wheels therefor, endless carriers mounted in the frame, picker spindle supports on the carriers, endless traveling belts operating with but at a higher rate of speed than the carriers, picker spindles horizontally journaled in said supports and having fixed rollers at their inner ends, stationary guide tracks parallel with the belts, said rollers being confined between the fixed tracks and the belts and rotated by frictional engagement therewith, and cotton collecting means carried by the spindles.

7. In a cotton harvester, the combination with picker spindles, of means for rotating the spindles, said means including endless traveling belts and opposed stationary guides, between which belts and guides the spindles are frictionally engaged and rotated.

8. In a cotton harvester, picker spindles, and means for rotating the spindles, said means including endless traveling belts and opposed stationary guides, between which belts and guides the spindles are frictionally engaged and rotated, endless carriers, vertical picker spindle supports on the carriers pivotally mounted so as to turn in a horizontal direction, and having a plurality of arms on their lower ends, a cam guide over which said arms pass and by which the supports are turned in their bearings to change the angle of the picker spindles, and stripping devices through which the spindles are drawn lengthwise during the travel of the carriers.

9. In a cotton harvester, the combination of a frame, supporting wheels therefor, a supplemental frame, crank shafts mounted on the supplemental frame and journaled on the main frame and capable of a vertical swinging movement about the journals of said shafts, picking mechanism carried by the supplemental frame and comprising vertical shafts at each end of said supplemental frame, sprocket-wheels on said vertical shafts, endless chains passing around said sprocket-wheels, vertically arranged picker spindle supports carried by the chains, horizontal picker spindles turnably mounted in said supports, sleeves on said vertical shafts, pulleys fixed to said sleeves, endless traveling belts passing around the pulleys and spaced guides parallel with the edges of said belts and alternating therewith, said picker spindles having their inner ends confined between the edges of said belts and opposed fixed guides and being rotated by the frictional engagement of said belts and guides, and means for holding the supplemental frame in its adjusted position.

10. In a cotton harvester, the combination of a main frame, bearing wheels therefor, a supplemental frame, crank shafts journaled in the main frame and supporting the supplemental frame, vertical shafts at opposite ends of the supplemental frame, sprocket-wheels at opposite ends of said shaft and chains passing over said sprocket wheels, sleeves loose on said shafts, one of said shafts having a second sprocket-wheel and said sleeve having a sprocket-wheel, a chain passing around the second named sprocket wheel to the sprocket-wheel on the sleeve, said sleeve-sprocket wheel being of less diameter than the second sprocket on the other shaft whereby the sleeve is rotated at an increased speed, pulleys on said sleeves, belts passing around said pulleys, and fixed guides parallel with the shaft, picker spindle supports carried by the first-named sprocket wheels, and horizontally disposed picker spindles rotatably mounted in said supports, said spindles having their inner ends in frictional engagement with said fixed guides and the opposed belts whereby the spindle is rotated at high speed.

11. In a cotton harvester, the combination with a main frame, a supplemental frame mounted therein, endless carriers mounted in the supplemental frame, vertical shafts and means for operating the carriers, sleeves on said shafts having pulleys fixed to them, endless bands passing around the pulleys, means for imparting to the sleeves a rotation in excess of that of the travel of the carriers, picker spindle supports movable with the carriers, fixed guides alternating with and opposing the bands, picker spindles horizontally journaled on said supports and having their inner ends in frictional engagement with the fixed guides and movable bands, means for changing the angular position of the picker arms at the rear end of the machine, and means for stripping the collected cotton from said picker spindles.

12. In a cotton harvester, the combination with a main frame, a supplemental frame mounted therein, endless carriers mounted in the supplemental frame, vertical shafts and means for operating the carriers, sleeves on said shafts having pulleys fixed to them, endless bands passing around the pulleys, means for imparting to the sleeves a rotation in excess of that of the travel of the carriers, picker spindle supports movable with the carriers, fixed guides alternating with and opposing the bands, picker spindles horizontally journaled on said supports and having their inner ends in frictional engagement with the fixed guides and movable bands, means for changing the angular position of the picker arms at the rear end of the machine, and means for stripping the collected cotton from said picker spindles, said supplemental frame having a trough upon which the discharged cotton falls, and a horizontally operating plunger for feeding the cotton out of said trough.

13. A cotton harvester comprising a main frame and supporting wheels, a vertically adjustable supplemental frame inclined relatively to the main frame, vertical shafts at the ends of the supplemental frame and means for operating said shafts, a series of pulleys surrounding said shafts and spaced apart, and loosely mounted relatively to the shafts, endless bands passing around the pulleys, guides parallel with the endless traveling bands, picker spindle supports having picker spindles horizontally mounted therein, said spindles having their inner ends confined in frictional engagement with said bands and the opposed guides and rotated by contact therewith, a cam at the front end of the machine for changing the angular position of the picker spindles, said spindles carrying a plurality of arms at their lower ends successively engaging the cam, means at the opposite end of the machine for stripping the cotton from the spindles, said supplemental frame having a trough into which the cotton falls from the spindles, and a feeding plunger operating in said trough for discharging cotton from the rear end of the machine into a suitable receiver.

In testimony whereof I affix my signature in presence of two witnesses.

LUCIUS L. UPSHAW.

Witnesses:
T. WALTER FOWLER,
C. W. FOWLER.